United States Patent [19]

Coleman

[11] 3,941,836

[45] Mar. 2, 1976

[54] CYCLOALIPHATIC CARBOXAMIDES

[75] Inventor: Lester Earl Coleman, Willoughby Hills, Ohio

[73] Assignee: The Lubrizol Corporation, Cleveland, Ohio

[22] Filed: Nov. 20, 1973

[21] Appl. No.: 417,655

Related U.S. Application Data

[60] Continuation-in-part of Ser. No. 341,008, March 14, 1973, abandoned, which is a continuation-in-part of Ser. No. 161,972, July 12, 1971, abandoned, which is a continuation-in-part of Ser. No. 40,457, May 25, 1970, abandoned, which is a division of Ser. No. 691,698, Dec. 19, 1961, Pat. No. 3,549,340.

[52] U.S. Cl. 260/557 R; 260/247.1 T; 260/247.7 V; 260/268 C; 260/293.65; 260/307 R; 260/309.6; 260/309.7; 260/310 D; 260/326.1; 260/326.13 R; 260/326.4; 260/326.83; 260/326.84; 260/327 R; 260/345.5; 260/514 G; 260/345.7; 260/347.5; 260/347.8; 260/453 R; 260/464; 260/468 J; 260/514 L; 260/557 B

[51] Int. Cl.$^2$ .................................. C07C 103/19

[58] Field of Search ........... 260/557 B, 557 R, 464, 260/478, 514

[56] References Cited

UNITED STATES PATENTS

| | | | |
|---|---|---|---|
| 2,872,483 | 2/1959 | Bloch | 260/557 B |
| 2,908,712 | 10/1959 | Roberts et al. | 260/557 B |
| 3,041,357 | 6/1962 | Phillips et al. | 260/348 |
| 3,813,438 | 5/1974 | Oshima et al. | 260/561 N |

*Primary Examiner*—Robert V. Hines
*Assistant Examiner*—Thomas A. Waltz
*Attorney, Agent, or Firm*—James W. Adams, Jr.; William H. Pittman

[57] ABSTRACT

Fuel compositions for internal combustion engines containing Diels-Adler adducts of N-3-oxohydrocarbon acrylamides or N-3-hydroxyhydrocarbon acrylamides with conjugated diene compounds such as 1,3-butadiene, cyclopentadiene. The adducts also have utility as solubilizing agents, plasticizers, and ultraviolet absorbing additives for polymeric compositions.

16 Claims, No Drawings

CYCLOALIPHATIC CARBOXAMIDES

This application is a continuation-in-part of co-pending application Ser. No. 341,008, filed Mar. 14, 1973, now abandoned. That application is a continuation-in-part of Ser. No. 161,972, filed July 12, 1971, now abandoned, which is a continuation-in-part of Ser. No. 40,457, filed May 25, 1970, now abandoned, which in turn is a division of Ser. No. 691,698, filed Dec. 19, 1967, now U.S. Pat. No. 3,549,340.

This invention relates to new compositions of matter, and more particularly to compounds having one of the formulas (I) 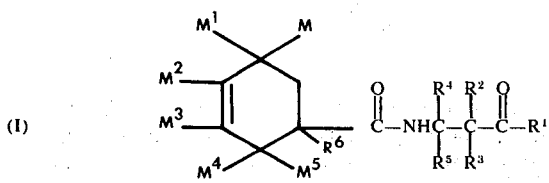

(II) 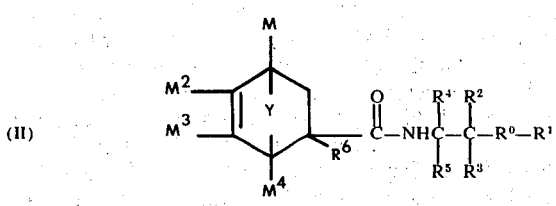

wherein each of M, $M^1$, $M^2$, $M^3$, $M^4$ and $M^5$ is hydrogen, halo, nitro, cyano, carboxy, $-NZ^1Z^2$,

formyl, formyloxy, hydroxy, mercapto, hydrocarbyl of up to 20 carbon atoms, or hydrocarbyl-X— of up to 20 carbon atoms where X is

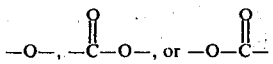

with the proviso that the hydrocarbyl-and hydrocarbyl-X— radicals may be substituted by one or more of said monovalent radicals; each of $Z^1$ and $Z^2$ is hydrogen or hydrocarbyl of up to 20 carbon atoms, or $-NZ^1Z^2$ is a heterocyclic radical; each of $R^1$, $R^2$, $R^3$, $R^4$ and $R^5$ is hydrogen or hydrocarbyl of up to 10 carbon atoms with the proviso that the hydrocarbyl radicals may be substituted by one or more of said monovalent radicals; $R^6$ is hydrogen or hydrocarbyl of no more than 10 carbon atoms;

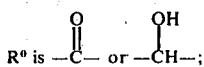

and Y is alkylene or haloalkylene of up to four carbon atoms.

The term "hydrocarbyl" as used herein is intended to encompass the monovalent radical of an aliphatic, cycloaliphatic, aromatic, arylaliphatic, aliphaticaryl, arylcycloaliphatic, cycloaliphaticalkylaryl, cycloaliphaticaryl, or cycloaliphaticalkyl hydrocarbon, and the like, of up to about 20 carbon atoms, usually 10 or less. Hydrocarbyl radicals are illustrated by:

1. Alkyl: Methyl, ethyl, propyl, isopropyl, butyl, tertiary butyl, heptyl, nonyl, decyl, octadecyl, etc.
2. Alkenyl: Vinyl, allyl, 1-butenyl, isobutenyl, 2-pentenyl, 3,4-dimethyl-2-hexenyl, 1-octenyl, 1-decenyl, etc.
3. Cycloalkyl: Cyclopentyl, cyclohexyl, cyclooctyl, alkylcycloalkyl such as 2,3-dibutylcyclohexyl, cycloalkylcycloalkyl such as 3-cyclohexylcyclohexyl, etc. (preferably, the number of carbons in the nucleus of the cycloalkyl groups is five or six, any additional carbons in these groups being derived from hydrocarbon containing substituents attached thereto, the total number of carbons being up to about 20.
4. Cycloalkenyl: Cyclopentenes, cyclohexenes, cycloheptenes, etc., corresponding to the above class of cycloalkyl groups but containing at least one ethylenic linkage in the nucleus thereof.
5. Aryl: Phenyl, naphthyl, alkylaryl such as decylphenyl and tolyl, 3-propylnaphthyl, alkenylaryl such as p-allyl-phenyl, cycloalkyl aryl such as 3-cyclohexylphenyl, etc., with phenyl and substituted phenyl being the preferred aryl hydrocarbyl groups.

It is clear that there are many obvious variations of these hydrocarbyl radicals which are clearly equivalent and fall within the scope of the present invention. Thus, other representative hydrocarbyl groups are arylalkyl such as benzyl and phenethyl, alkylarylalkyl such as tolylpropyl, cycloalkylalkyl such as cyclohexylmethyl, and the like.

Substituted hydrocarbyl and hydrocarbyl-X— radicals are considered equivalent to the hydrocarbyl and hydrocarbyl-X— radicals for the purposes of this invention. Examples of these substituted hydrocarbyl radicals are aminoethyl, dimethylaminobutyl, ethoxyethyl, β-mercaptoethyl, 1,5-dichloropentyl, 3-ethylmercaptocyclohexyl, 8-nitrodecyl, 4-formylbutyl, 3-hydroxypropyl, p-aminophenyl, m-propylaminophenyl, p-ethoxybenzyl, 2-methylcycloheptyl, 1-nitro-3-hydroxybutyl, β-cyclohexyloxyethyl, 2-bromopropyl, 3-trifluoromethylpropyl, trifluoromethyl, 3-cyanobutyl, α-chloroacetyloxy, 3-carbamylpropoxy, 4-chlorobutoxycarbonyl, 3-aminopropionyloxy, 2-iodobutylsulfonyl, 4-methoxycyclohexylsulfonyl, β-diethylaminoethylsulfonyl and the like.

Representative of the five or six-membered heterocyclic radicals contemplated by this invention as represented by the group $-NZ^1Z^2$ are pyrrolyl, pyrrolidinyl, pyrrolinyl, chromanyl, pyranyl, isochromanyl, thienyl, imidazolidinyl, imidazolinyl, pyrazolidinyl, pyrazolinyl, piperidyl, piperazinyl, morpholinyl, thiomorpholinyl, and the like. Also included within this group of heterocyclic radicals are the corresponding substituted heterocyclic radicals containing from one to three substituents selected from the class consisting of lower alkyl, lower alkoxy, halo, hydroxy, mercapto, lower alkylmercapto, nitro, amino, and lower alkyl amino. (The adjective "lower" as employed in conjunction with a carbon-containing radical herein is intended to limit the carbon content of the radical to a maximum of seven carbons. Thus "lower alkyl" includes methyl, ethyl, butyl, tertiary butyl, isoamyl, heptyl, etc.)

Generally, not more than three of the M variables, preferably not more than one or two, are other than hydrogen. Moreover, when M–M⁵ are other than hydrogen, they are preferably lower alkyl, halo, lower alkoxy, lower alkenyl, lower alkenyloxy, carboxy, cyano, amino, lower alkylamino, di-lower alkylamino or phenyl. Substituted phenyl radicals, containing one to three substituents corresponding to these M variables, are considered equivalent to the phenyl radicals for the purposes of this invention. Generally, each M radical is individually hydrogen, lower alkyl or halo and is usually hydrogen or lower alkyl, and the total number of carbon atoms is M–M⁵ is up to twenty.

The $R^1$–$R^5$ radicals in the compounds of this invention are, as indicated, hydrogen or hydrocarbyl or substituted hydrocarbyl radicals as defined hereinabove. They are usually each hydrogen or hydrocarbyl of up to 10 carbon atoms, especially hydrogen or lower alkyl. Preferably, $R^2$ and $R^3$ are each hydrogen and $R^1$, $R^4$ and $R^5$ are each lower alkyl. $R^6$ is hydrogen or a hydrocarbyl radical containing no more than 10 carbon atoms, and is usually hydrogen or lower alkyl, especially methyl.

The $R^o$ radical is, as indicated

(carbonyl) or

(hydroxymethylene), and Y is a $C_{1-4}$ alkylene or haloalkylene radical and is preferably $CH_2$ or $CCl_2$.

The compounds of this invention may be prepared by the Diels-Alder reaction between a diene of the formula (III) 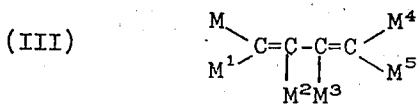 or (IV) 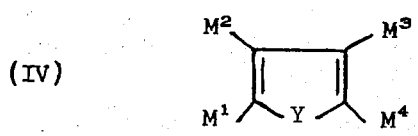

and a dienophile which is a substituted acrylamide of the formula (V) 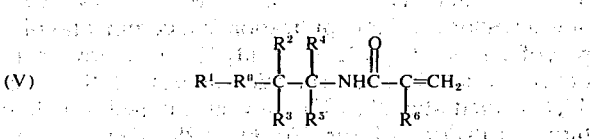

wherein M–M⁵, $R^o$–$R^6$ and Y are as previously defined ($R^o$ being

when the diene has formula III). The Diels-Alder reaction, or "diene synthesis" as it is sometimes denominated, is a well known chemical reaction used extensively in organic syntheses. Frequent mention of the reaction is found in prior literature and patents, e.g., 1,891,043; 2,072,867; 2,262,002; 2,264,354; 2,357,910; 2,391,226; 2,450,765; 2,467,926; 2,493,964; 2,781,393; 3,287,395. A summary of the prior art relating to the diene synthesis is found in the Russian monograph, Dienovyi Sintex, Izdel. Akad. Nauk. SSR, 1963, by A. S. Onishchenko. (Translated into the English language by L. Mandel as A. S. Onishchenko, Diene Synthesis, N.Y., Daniel Davey and Co., Inc. 1964.) To avoid useless repetition of what is well-known in the art, this monograph and reference cited therein are incorporated by reference into the present specification.

Basically, the Diels-Alder reaction involves contacting, under Diels-Alder conditions, a conjugated diene with an ethylenically unsaturated compound, the latter being known as a dienophile. This reaction typically proceeds through an addition reaction in which one dienyl group and one dienophile combine to form a cyclic adduct commonly referred to as a Diels-Alder adduct.

The conjugated dienes contemplated as reactants for the preparation of the compounds of this invention can be aliphatic, alicyclic, aromatic, or heterocyclic. As is apparent to those skilled in the art, the diene can contain more than two olefinic groupings as long as at least two are conjugated.

Specific aliphatic dienes useful for the purposes of this invention are listed in Table I.

TABLE I

| M | M¹ | M² | M³ | M⁴ | M⁵ |
|---|---|---|---|---|---|
| $CH_3$— | H | H | H | H | H |
| Phenyl | H | H | H | H | H |
| HOOC— | H | H | H | H | H |
| N≡C— | H | H | H | H | H |
| $CH_3O$— | H | H | H | H | H |
| $CH_3\overset{O}{\underset{\|}{C}}$—O— | H | H | H | H | H |
| $(CH_3CH_2)_5N$— | H | H | H | H | H |
| $CH_3CH_2O$— | H | H | H | H | H |
| $NO_2$— | H | H | H | H | H |
| $CH_3\overset{O}{\underset{\|}{C}}$— | H | H | H | H | H |
| $H—\overset{O}{\underset{\|}{C}}$— | H | H | H | H | H |

TABLE I-continued

| M | M¹ | M² | M³ | M⁴ | M⁵ |
|---|---|---|---|---|---|
| H | H | $CH_3-$ | H | H | H |
| H | H | Phenyl | H | H | H |
| H | H | $CH_3O-$ | H | H | H |
| H | H | $H-\overset{O}{\underset{\|}{C}}-O$ | H | H | H |
| H | H | Cl— | H | H | H |
| $CH_3(CH_2)_3-$ | H | H | H | H | H |
| tert-butyl | H | H | H | H | H |
| H | H | i-propyl | H | H | H |
| H | H | tert-butyl- | H | H | H |
| $CH_3-$ | H | $CH_3-$ | H | H | H |
| $CH_3-$ | H | Phenyl- | H | H | H |
| $CH_3-$ | H | Cl— | H | H | H |
| $CH_3CH_2-$ | H | Cl— | H | H | H |
| Phenyl- | H | $CH_3CH_2$ | H | H | H |
| Phenyl- | H | $CH_3O-\overset{O}{\underset{\|}{C}}-$ | H | H | H |
| Phenyl- | H | Phenyl- | H | H | H |
| $CH_3-$ | $CH_3-$ | $CH_3-$ | H | H | H |
| $CH_3-$ | $CH_3-$ | i-propyl- | H | H | H |
| Phenyl- | H | H | H | $CH_3-$ | H |
| H | H | $CH_3-$ | Phenyl- | H | H |
| H | H | Cl— | $CH_3-$ | H | H |
| HOOC— | H | H | H | HOOC— | H |
| Phenyl- | H | Phenyl- | H | $CH_3-$ | H |
| Phenyl- | H | H | Phenyl- | H | H |
| H | H | Phenyl- | Phenyl- | H | H |
| Cl | H | H | H | Cl— | H |
| Br— | H | $CH_3-$ | H | H | H |
| Cl— | H | H | $CH_3-$ | H | H |
| $CF_3-$ | H | H | $CH_3-$ | H | H |
| $CF_3-$ | H | H | H | H | H |
| H | $CF_3-$ | H | H | H | H |
| H | F— | H | H | H | H |
| H | Br— | H | H | H | H |
| $CH_3(CH_2)_3-O-$ | H | H | H | H | H |
| H | H | H | $CH_3CH_2O-$ | H | H |
| $CH_3(CH_2)_5-$ | H | H | H | $HOOC-(CH_2)_7-$ | H |
| $CH_3CH_2CH_2O-$ | H | H | H | H | H |
| $CH_3CH_2-$ | H | H | H | $CH_3CH_2-$ | H |
| p-chloro-phenyl | H | H | H | H | H |
| Cyclohexoxy- | H | H | H | H | H |
| H | H | F— | H | H | H |
| Tolyl | H | H | H | H | H |
| p-fluoro-phenyl | H | H | H | H | H |
| 3,4-dimethoxy-phenyl | H | H | H | H | H |
| 3,4-methlene-dioxyphenyl | H | H | H | H | H |

Illustrative aromatic dienes include those aromatic compounds containing at least 10 nuclear carbon atoms (i.e., condensed aromatic compounds) in the nuclei thereof. Naphthalene; 1,2,3,4-tetramethylnaphthalene; 2,3-diethyl-naphthalene; 1,2-dimethylnaphthalene; anthracene; 2-isopropenylanthracene; 9,10-dimethylanthracene; 9-phenylanthracene; 1,2-benzanthracene; 3-methylcholanthracene; 9-anthracenecarboxylic acid; 9-formylanthracene; 1,5-dichloro-9-acetoxyanthracene; 9-nitroanthracene; 9-bromoanthracene; tetracene (or naphthacene); pentacene and the like, are examples of suitable aromatic dienes.

Suitable heterocyclic dienes are furan; 2,5-dimethylfuran; 2-ethylfuran; 2-(β-phenylethyl)furan; 2-(β-m-methoxyphenylethyl)furan; furfuryl acetate; furfuryl alcohol; furfuryl methyl ether; 2-acetoxyfuran; 2-(β-carboxyethyl)-furan; 3-bromofuran; 1,3-diphenylisobenzofuran; α-pyrone; 5-methy- or 5-ethyl-α-pyrone; 1-methylisoindole; oxazoles such as 2,5-dimethyloxazole; and the like.

Alicyclic dienes useful for the preparation of the compounds of this invention include 1,3-cyclopentadiene and 1,3-cyclopentadienes substituted with halo, lower alkyl, lower alkoxy, carboxy, amino, etc. such as 1,5,5- and 1,3,4-trimethylcyclopentadiene, cyclopentadiene carboxylic acid, methyl ester of cyclopentadienecarboxylic acid, spiroheptadiene, isoclicyclopentadiene, hexachlorocyclopentadiene, 6,6-dimethylfulvene, 6,6-diphenylfulvene, etc. Other suitable cyclic dienes are cyclohexadiene-1,3; 1-formylcyclohexadiene-1,3; 1-acotoxycyclohexadiene-1,3; 1,3-dichlorocyclohexadiene-1,3; cycloheptadiene-1,3; cycloheptatriene-1,3,5; cyclooctatriene-1,3,5; etc.

For reasons of economy, availability and the like, the preferred dienes of formula III are 1,3-butadiene, isoprene, 1,3-pentadiene and chloroprene, while those of formula IV are 1,3-cyclopentadiene and hexachloro-1,3-cyclopentadiene.

The dienophiles corresponding to formula V are an art-recognized class comprising the N-3-oxohydrocarbon-substituted acrylamides and the 3-hydroxy compounds derived therefrom. This class of compounds as well as methods for preparing the compounds within the class are disclosed in U.S. Pat. Nos. 3,277,056; 3,425,942; and 3,585,125. These patents are incorporated herein by reference for their disclosure of the dienophiles.

The following are examples of typical dienophiles suitable for preparing the compounds of this invention.

N-(1,1-Dimethyl-3-oxobutyl)acrylamide

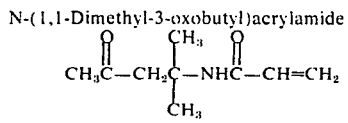

N-(1-Methyl-3-oxopropyl)methacrylamide

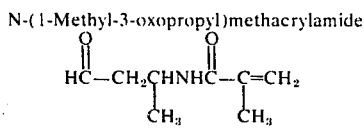

N-(1,3-Diphenyl-1-methyl-3-oxopropyl)acrylamide

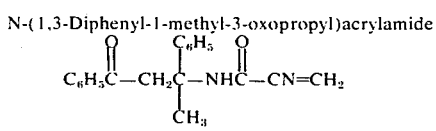

N-(1,1-Dimethyl-3-hydroxybutyl)acrylamide

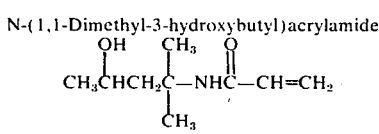

Other suitable dienophiles are N-3-oxopropylacrylamide, N-3-oxobutylacrylamide, N-(1-methyl-3-oxobutyl)acrylamide, N-(1-methyl-1,3-dicyclohexyl-3-oxopropyl)acrylamide, N-(1,2-dimethyl-1-ethyl-3-oxobutyl)acrylamide, N-(1,5-dimethyl-1-isopropyl-3-oxohexyl)acrylamide, N-(1,1-diisobutyl-2-isopropyl-5-methyl-3-oxohexyl)acrylamide, N-(1,1-dibutyl-2-n-propyl-3-oxoheptyl)acrylamide, N-(1-methyl-3-oxobutyl)-methacrylamide. The preferred dienophile is N-(1,1-dimethyl-3-oxobutyl)acrylamide, also known as diacetone acrylamide.

The Diels-Alder reaction conditions are obviously well known in the art. Generally, the diene and dienophile are brought into intimate contact for a period of up to about 144 hours, and at temperatures varying from about 0°C. to about 200°C. Normally, satisfactory reaction takes place at temperatures of 80°-180°C. for four to twenty-four hours. The optimum conditions for the preparation of Diels-Alder adduct from a specific diene and a specific dienophile is easily ascertained by routine trials. This determination can be greatly simplified by reference to the above-mentioned monograph which presents an excellent summary of the prior art process conditions and refers to particular references disclosing reaction conditions found suitable for an extremely diverse group of dienes.

The reaction may be facilitated by low initial temperatures (e.g., −30°C.) and/or super atmospheric pressure, particularly where the diene is volatile. Reflux conditions are normally employed to prevent the loss of reactants, product, and/or solvent through evaporation if the reaction is not conducted in a closed vessel. Moreover, the reaction can be, and usually is, conducted in the presence of an inert reaction medium such as water, the aromatic hydrocarbons (e.g., benzene, xylene, toluene), alcohols (e.g., ethyl alcohol, methyl alcohol and propyl alcohol), non-aromatic hydrocarbons (e.g., heptane, pentane, cyclohexane), acetic acid, dioxane, chloroform, nitrobenzene, chlorobenzene, ethers (e.g., ethyl ether), pyridine, N,N-dimethlformamide, N,N-dimethylacetamide, ketones (e.g., acetone), and mixtures of two or more of these. In many instances, an excess of the diene reactant can serve as a diluent.

Since both reactants are ethylenically unsaturated, there is a possibility that they will undergo polymerization. In any situation where polymerization appears to be a problem in the process for making the adducts, it is readily overcome simply by incorporating one or more polymerization inhibitors such as hydroquinone, di-t-butyl-p-cresol, or t-butylcatechol into the reaction mixture.

The following examples illustrate the preparation of the compounds of the invention.

EXAMPLE 1

A mixture comprising 676 grams (4 moles) of diacetone acrylamide, 676 grams of benzene, 6.85 grams of hydroquinone (polymerization inhibitor) is added to 4300 ml. capacity autoclave and cooled to about 25°C. Liquid butadiene (238 grams; 4.4 moles; B.P. − 4.4°C.) is added and the autoclave is sealed. Then the autoclave is allowed to warm to room temperature and then heated at about 145°-155°C. for 8.5 hours. After this heating, the autoclave is vented and the liquid contents thereof decanted. The decanted liquid is stripped at reduced pressure to remove the benzene and filtered. The filtrate, weighing 745 grams (82.5% yield) is the desired adduct and is characterized by a nitrogen content of 6.35% by weight.

EXAMPLES 2–15

Following the procedure of Example 1, the Diels-Alder adducts of the dienes and dienophiles presented in Table II are successfully prepared. Since the only reason for the low initial temperature used in Example 1 is to facilitate the handling and reduce the loss of the volatile butadiene, it is obvious that such low temperaturs can be omitted when less volatile dienes are employed.

TABLE II

| Example | Diene | Dienophile |
| --- | --- | --- |
| 2 | Butadiene-1,3 | N-3-oxopropylacrylamide |
| 3 | '' | N-(1,2-dimethyl-1-ethyl-3-oxobutyl)acrylamide |
| 4 | '' | N-(1,1-dibutyl-2-n-propyl-3-oxoheptyl)acrylamide |
| 5 | '' | N-(1-methyl-3-oxobutyl)-methacrylamide |
| 6 | '' | N-(1-methyl-1,2-dicyclohexyl-3-oxobutyl)acrylamide |
| 7 | '' | N-(1,3-diphenyl-1-methyl-3-oxopropyl)acrylamide |
| 8 | '' | N-[1,3-di-(p-nitrophenyl)-1-methyl-3-oxopropyl]methacrylamide |
| 9 | '' | N-(1,5-dimethyl-1-isopropyl-3-oxohexyl)acrylamide |
| 10 | '' | N-(1,1-dimethyl-3-hydroxybutyl)acrylamide |
| 11 | '' | N-3-hydroxypropylacrylamide |
| 12 | '' | N-(1-methyl-3-hydroxybutyl)methacrylamide |
| 13 | '' | N-(1,5-dimethyl-1-isopropyl-3-hydroxyhexyl)acrylamide |
| 14 | isoprene | diacetone acrylamide |
| 15 | '' | N-(1,1-dimethyl-3-hydroxy butyl)acrylamide |

Obviously, by substituting an equivalent amount of other dienes (e.g., chloroprene; 1-carbethoxybutadiene-1,3; 1-diethylaminobutadiene-1,3, etc.) or other dienophiles according to Formula I for those of Examples 1–15, other adducts are readily prepared.

EXAMPLE 16 a. To a reaction mixture comprising 132.2 grams (2 moles) of 1,3-cyclopentadiene, 172 grams of n-hexane, and 3.5 grams of hydroquinone in a glass reaction vessel fitted with reflux condenser and stirrer there is slowly added over a 40-minute period 338 grams (2 moles) of diacetone acrylamide. This mixture is allowed to stand for several hours and finally heated to about 150°C. for 7 hours. The reaction mixture is then cooled, filtered, and stripped to remove the n-hexane. The resulting product is the desired Diels-Alder adduct.

b. A reaction mixture comprising 16.9 grams (0.1 mole) of diacetone acrylamide and 27.3 grams (0.1 mole) of hexachlorocyclopentadiene-1,3 at room temperature is slowly heated to 100°C., maintained at 100°C. for 0.5 hr., cooled to room temperature, and extracted with four 100-ml. portions of textile spirits. The extract upon cooling yielded crystals which were collected by filtration, recrystallized from textile spirits and again recrystallized from a methanol-water mixture to produce white crystals melting at 125°–128°C. Nitrogen content — 3.15% by weight; chlorine content — 48.0% by weight.

EXAMPLE 17

Equimolar quantities (1 mole each) of 2,3-dimethylbutadiene-1,3 and diacetone acrylamide in 110 grams of xylene are refluxed at atmospheric pressure for 24 hours to prepare the desired adduct.

EXAMPLES 18–25

Following the procedure of Example 17, adducts are prepared from the diene and dienophiles presented in Table III.

TABLE III

| Example No. | Diene | Dienophile | |
|---|---|---|---|
| 18 | 1,4-dimethylbutadiene-1,3 | Diacetone | acrylamide |
| 19 | 1,1,3-trimethylbutadiene-1,3 | " | " |
| 20 | trans-1-phenylbutadiene-1,3 | " | " |
| 21 | 1-o-nitrophenylbutadiene-1,3 | " | " |
| 22 | 2-fluorobutadiene-1,3 | " | " |
| 23 | 1-ethoxybutadiene-1,3 | " | " |
| 24 | 1-acetoxybutadiene-1,3 | " | " |
| 25 | 1-cyanobutadiene-1,3 | " | " |

By substituting other dienophiles corresponding to Formula I or Formula V above for diacetone acrylamide, the analogous adducts of the dienophiles of Table III are readily prepared. Likewise, adducts of diacetone acrylamide with other 1,3-cyclopentadiene derivatives can be prepared by the method of Example 16(a) or (b). For example, by substituting equimolar amounts of 1,3,4-trimethylcyclopentadiene-1,3 for the cyclopentadiene of (a) corresponding adducts are prepared. The adducts of other cyclic dienes such as cyclohexadiene-1,3 and its derivatives can be prepared by following these general procedures.

The polyhalogenated (e.g., polychloro- or polybromo-) adducts, such as those of 1,3-hexachlorocyclopentadiene with dienophiles corresponding to formula V, especially where $R^1$–$R^6$ are hydrogen or lower alkyl (e.g., diacetone acrylamide), are characterized by pesticidal properties, especially insecticidal, bactericidal, and herbicidal properties. When used as insecticides, these adducts are dispersed or dissolved in suitable inert diluents and applied to the habitat of the insects to be destroyed. Usually, the concentration of adduct will be from about 0.1% to about 10% by weight of the solution of dispersion when used as an insecticide. These chloro-containing adducts are also useful as bactericides in fuels such as jet fuels, diesel fuels, etc., when employed in concentrations of about 0.05% to about 2% by weight.

The compounds of this invention are also useful as exhaust odor suppressants for liquid petroleum distillate fuels, particularly diesel fuels. They are generally so employed by dissolution in the fuel in amounts of from about 10–100 pounds per thousand barrels of fuel. Preferably, the concentration of the compound of this invention is 25–50 pounds per thousand barrels of fuel.

The effectiveness of the compounds of this invention as odor suppressants is typified by the following test results. In these tests, the exhaust gases are rated as to the intensity (0 = no odor; 5 = very strong odor) and irritating characteristics (0 = pleasant odor; 5 = very objectionable odor). A commercial diesel fuel, evaluated with and without the adduct of Example 1, produces the results given in Table IV.

TABLE IV

| Test No. | Concentration of Adduct, lb./1000 Barrels | Average Odor Rating Intensity | Irritation |
|---|---|---|---|
| 1 | 0 | 3.1 | 2.5 |
| 2 | 25 | 1.6 | 1.8 |
| 3 | 50 | 2.3 | 1.8 |
| 4 | 0 | 3.0 | 2.7 |
| 5 | 25 | 2.3 | 1.7 |
| 6 | 50 | 2.3 | 1.2 |

Similar results can be achieved with the substitution of other adducts discussed above for all or a portion of the diacetone acrylamide-butadiene adduct in diesel fuel compositions.

By substituting any of the adducts of Examples 2–25 for that of Example 1 in the tested diesel compositions in concentrations of 25 to 50 pounds/1000 barrels of fuel, other specific fuel compositions are readily prepared.

Of course, it will be apparent that the fuel compositions can contain other conventional additives such as smoke suppressants, corrosion inhibitors, antioxidants, ashless dispersants, demulsifiers, antistatic agents, and the like.

In addition to the foregoing properties, the compounds of this invention have a variety of other uses. For example, the liquid compounds can be used as solubilizing agents due to the combination of the relatively polar carbamyl side chain and the relatively non-polar cyclic ring. Thus, they can be used to promote dispersion of various materials in liquid media, for example, the components of paints in the conventional paint bases, e.g. linseed oil, turpentine, etc. The compounds are also useful as plasticizers and ultraviolet absorbing additives in polymeric compositions such as polyvinyl chloride. In these latter applications, the compounds are incorporated into the polymeric compositions in amounts of about 0.1%–10% by weight and usually, 0.5% to 5% by weight.

What is claimed is:

1. A compound having one of the formulas

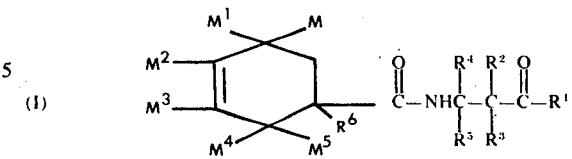

(I)

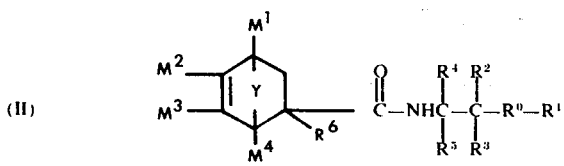

wherein each of M, M¹, M², M³, M⁴ and M⁵ is hydrogen, methyl or halo with the proviso that no more than three of the M values are other than hydrogen; each of R¹, R², R³, R⁴, R⁵ and R⁶ is hydrogen or lower alkyl; R⁰ is

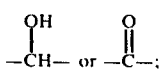

and Y is CH₂ or CCl₂.

2. A compound according to claim 1 having formula I.

3. A compound according to claim 2 wherein R² and R³ are each hydrogen; each of R¹, R⁴ and R⁵ is lower alkyl; and each of M, M¹, M², M³, M⁴ and M⁵ is hydrogen or methyl.

4. A compound according to claim 3 wherein R¹, R⁴ and R⁵ are each methyl, R⁶ is hydrogen, and M, M¹, M², M³, M⁴ and M⁵ are each hydrogen.

5. A compound according to claim 1 having formula II.

6. A compound according to claim 5 wherein R⁰ is

7. A compound according to claim 5 wherein R⁰ is

8. A compound according to claim 5 wherein each of M¹, M², M³ and M⁴ is hydrogen.

9. A compound according to claim 8 wherein R² and R³ are each hydrogen and each of R¹, R⁴ and R⁵ is lower alkyl.

10. A compound according to claim 9 wherein R¹, R⁴ and R⁵ are each methyl.

11. A compound according to claim 10 wherein R⁶ is hydrogen.

12. A compound according to claim 11 wherein R⁰ is

13. A compound having the formula

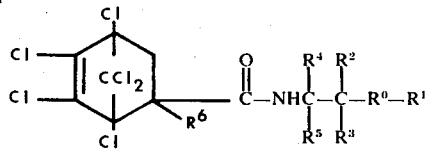

wherein each of R¹, R², R³, R⁴, R⁵ and R⁶ is hydrogen or lower alkyl and R⁰ is

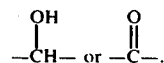

14. A compound according to claim 13 wherein R², R³ and R⁶ are each hydrogen and each of R¹, R⁴ and R⁵ is lower alkyl.

15. A compound according to claim 14 wherein R⁰ is

16. A compound according to claim 15 wherein R¹, R⁴ and R⁵ are each methyl.

* * * * *